W. ROSE.
Beer Cooler.
No. 53,682. Patented April 3, 1866.
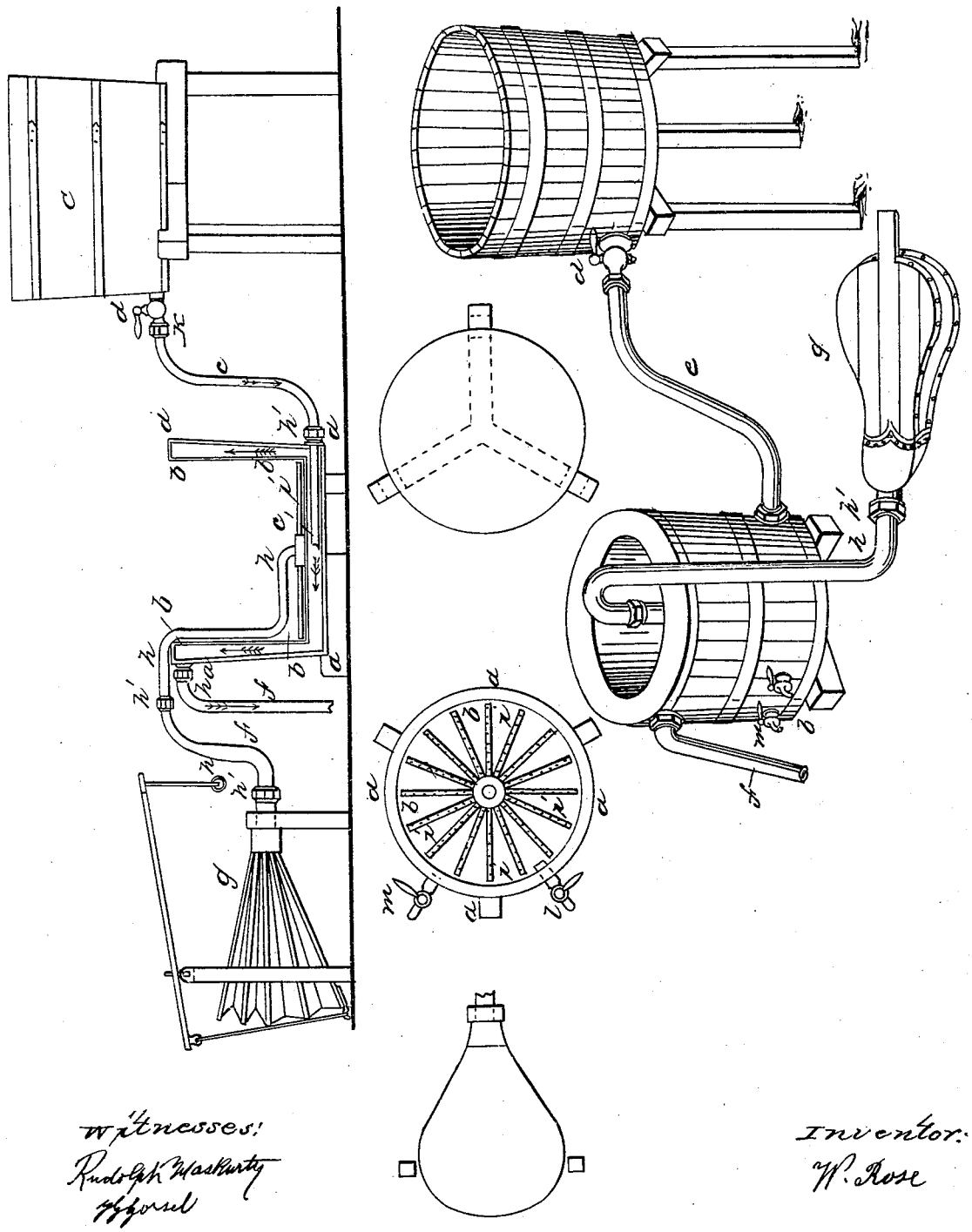

UNITED STATES PATENT OFFICE.

WILLIAM ROSE, OF ST. LOUIS, MISSOURI.

IMPROVED APPARATUS FOR COOLING BEER.

Specification forming part of Letters Patent No. 53,682, dated April 3, 1866.

*To all whom it may concern:*

Be it known that I, WILLIAM ROSE, of St. Louis, in the county of St. Louis, in the State of Missouri, have invented a new and Improved Mode of Cooling Beer-Mash and other Liquids; and I do hereby declare that the following is a full and exact description thereof, reference being had to the accompanying drawing, and to the letters of reference marked thereon.

The nature of my invention consists in forcing fresh air through the beer-mash or other liquid.

To enable others skilled in the art to make and use my invention, I will proceed and describe its construction and operation, and will suppose that the liquid to be cooled is beer, though every other liquid may be cooled by my invention.

When the beer has been boiled it becomes necessary to cool it as quick as possible for the purpose of bringing it to a vinous fermentation. Hitherto it was conducted into large shallow wooden vessels, called "coolers." In such vessels the largest extent of surface was brought in contact with the atmosphere, which was still increased by stirring. If the beer cannot be boiled in a temperature of less than 70° to 80° Fahrenheit, or if the cooling process lasts too long, the fermentation to follow cannot be a perfect vinous one, but will become more or less acid. Thus the brewer was only enabled to brew during winter or in cold nights, and not at all during the hot summer months. The cooling process takes about eight to nine hours, and, if the weather suddenly changes, the beer is spoiled. To avoid this the brewer was compelled, in order to furnish the necessary daily quantum of beer to his consumers, to brew in winter time the quantity needed for the coming warm season, which demanded a great capital totally idle half of the time.

My invention does away with these inconveniences and makes the cooling process independent of the temperture. It saves at the same time three-fourths of the time usually expended during the cooling process and a considerable quantity of beer, which by the old plan evaporates.

My invention is to accelerate the cooling process by means of fresh air, which is forced through the beer by means of bellows, air-pump, fan, or other contrivance worked by hand, steam, or other power. The beer gets better, clearer, and the fermentation is furthered. I lead the air from the bellows or other air-furnishing contrivance by means of a pipe into the bottom of the vessel containing the beer or other liquid to be cooled. (Marked H in the drawing.) The said pipe is connected at the bottom of the vessel with any amount of small pipes, (marked $i$,) which may be made in any shape and size and of any material desired. They may be horizontal, perpendicular, or inclined, and are pierced so as to allow the air to escape and to form a kind of a sieve, through which the air is forced into the beer or other liquid. Pipes as shown in the drawing will, however, have the preference, on account of the facility to take them apart for the purpose of cleaning.

The drawing shows in K the coupling or joints where the pipes can be disjointed. L, the crane where the cooled liquid is let off.

If the air can be drawn by the bellows or other contrivance from a cool place, cellar, or cave, it will still lessen the time for cooling.

In my drawing I also show a wooden vessel, C, filled with cold water, running through pipe $c$ into an interval between the kettle containing the liquid to be cooled and the outer vessel, $a$, and is discharged through crane K. This cold water, flowing around the cooling-vessel, will also take away a great deal of the heat of the liquid.

What I claim as my invention, and desire to secure by Letters Patent, is—

The process of forcing air through the liquid, thus bringing the liquid in closer contact with the air and reducing the temperature of the liquid to the temperature of the air forced through it.

WILLIAM ROSE.

Witnesses:
   H. WIAN,
   W. V. N. BAY.